US012323318B1

(12) United States Patent
Tsai (10) Patent No.: US 12,323,318 B1
(45) Date of Patent: Jun. 3, 2025

(54) NETWORK MANAGEMENT DEVICE AND METHOD FOR UPDATING RULES

(71) Applicant: TXONE NETWORKS INC., Hsinchu (TW)

(72) Inventor: Wen-Yen Tsai, Hsinchu (TW)

(73) Assignee: TXONE NETWORKS INC., Hsinchu (TW)

( * ) Notice: Subject to any disclaimer, the term of this patent is extended or adjusted under 35 U.S.C. 154(b) by 0 days.

(21) Appl. No.: 18/596,670

(22) Filed: Mar. 6, 2024

(51) Int. Cl.
G06F 15/16 (2006.01)
G06F 9/54 (2006.01)
H04L 29/06 (2006.01)
H04L 45/028 (2022.01)

(52) U.S. Cl.
CPC .................. *H04L 45/028* (2013.01)

(58) Field of Classification Search
CPC .......... H04L 45/028; H04L 43/0882
USPC ........................................... 709/238
See application file for complete search history.

(56) References Cited

U.S. PATENT DOCUMENTS

| 8,065,721 | B1* | 11/2011 | Shah | H04L 63/0209 |
| | | | | 726/13 |
| 10,158,733 | B2* | 12/2018 | Ungerer | G06F 16/951 |
| 10,367,703 | B2* | 7/2019 | Gibson | H04L 63/0263 |
| 11,356,319 | B2* | 6/2022 | Devaraj | H04L 43/0882 |
| 2007/0115957 | A1* | 5/2007 | Noirie | H04L 49/254 |
| | | | | 370/386 |
| 2009/0199266 | A1* | 8/2009 | Kling | H04L 63/0263 |
| | | | | 726/13 |
| 2012/0275466 | A1* | 11/2012 | Bhadra | H04W 28/02 |
| | | | | 370/419 |
| 2013/0007257 | A1* | 1/2013 | Ramaraj | H04L 63/0263 |
| | | | | 709/224 |
| 2013/0301641 | A1* | 11/2013 | Anand | H04L 63/0227 |
| | | | | 370/389 |
| 2013/0347103 | A1* | 12/2013 | Veteikis | H04L 43/04 |
| | | | | 726/22 |
| 2014/0089498 | A1* | 3/2014 | Goldfarb | H04L 45/742 |
| | | | | 709/224 |
| 2016/0269289 | A1* | 9/2016 | Akiyoshi | H04L 67/1001 |
| 2018/0159761 | A1* | 6/2018 | Shen | H04L 45/121 |
| 2018/0159898 | A1* | 6/2018 | Gibson | H04L 63/0263 |
| 2020/0409737 | A1* | 12/2020 | Lee | H04L 45/50 |
| 2022/0321475 | A1* | 10/2022 | Thiebaut | H04L 47/11 |
| 2022/0337545 | A1* | 10/2022 | Liu | H04L 12/4641 |
| 2023/0067498 | A1* | 3/2023 | Kugler | H04W 76/10 |

(Continued)

*Primary Examiner* — Hamza N Algibhah
(74) *Attorney, Agent, or Firm* — Chun-Ming Shih; HDLS IPR SERVICES (57) ABSTRACT

A network management device (100) is disclosed, which includes a transceiver circuit (110), a memory (120), and a processor (130). The processor (130) executes following steps: detecting multiple second packet processing rules respectively corresponding to each of multiple packet sets; respectively for each of the multiple packet sets, updating a packet processing rule table (121) by utilizing the second packet processing rules being different from multiple first packet processing rules, and calculating an average rule quantity of the second packet processing rules being different from the multiple first packet processing rules; and determining whether to stop updating the packet processing rule table (121) based on the multiple average rule quantities.

15 Claims, 5 Drawing Sheets

(56) References Cited

U.S. PATENT DOCUMENTS

2023/0262583 A1* 8/2023 Muñoz De La Torre Alonso ....... H04W 76/18 370/230

* cited by examiner

NETWORK MANAGEMENT DEVICE AND METHOD FOR UPDATING RULES

BACKGROUND OF THE DISCLOSURE

Technical Field

The disclosure relates to information management technology, and particularly to a network management device and method for updating rules.

Description of Related Art

In current network technology, a network management system generates packet processing rules by detecting traffic passing through the system and stores the generated packet processing rules after the detection is completed (e.g., stores the packet processing rules in the network access control list (ACL)). However, it is often difficult for network administrators to decide how long the network management system needs to monitor. In particular, the network administrators do not know how long a process of detecting network traffic passing through the system will finish (i.e., when to stop inspecting network traffic passing through the system), thereby enabling the stored packet processing rules to protect the system. Therefore, how to determine the stop timepoint of generating the packet processing rules is an urgent problem sought to be solved by those skilled in the art.

SUMMARY OF THE DISCLOSURE

An object of the present disclosure is to provide a network management device and a method of updating rules that determine when to stop generating packet processing rules, thereby greatly saving human resources of collecting rules and greatly reducing waste of resources in a system that continuously updates the rules.

In one of the exemplary embodiments, the network management device of the present disclosure includes:
- a transceiver circuit, configured for capturing multiple packet sets respectively transmitted in multiple scanning time periods sequentially arranged by multiple network devices, where the multiple scanning time periods have respective sequence numbers;
- a memory, configured for storing multiple instructions and a packet processing rule table, the packet processing rule table storing multiple first packet processing rules; and
- a processor, coupled to the transceiver circuit and the memory, and configured for executing the multiple instructions to perform following steps:
  detecting multiple second packet processing rules respectively corresponding to each of the multiple packet sets;
  respectively for the each of the multiple packet sets, updating the packet processing rule table by utilizing the second packet processing rules being different from the multiple first packet processing rules, and calculating an average rule quantity for the second packet processing rules being different from the multiple first packet processing rules;
  sequentially selecting multiple time intervals from the multiple scanning time periods based on the respective sequence numbers of the multiple scanning time periods, where a quantity for the scanning time periods included in each of the multiple time intervals is a window quantity; and
  calculating a trend slope of a trend line in the each of the multiple time intervals based on the average rule quantity corresponding to each of the packet sets captured in the each of the multiple time intervals by utilizing a trend construction algorithm, and determining whether to stop updating the packet processing rule table based on the multiple trend slopes.

In one of the exemplary embodiments, the method for updating rules of the present disclosure includes following steps:
- by a processor, detecting multiple second packet processing rules respectively corresponding to each of multiple packet sets, where the multiple packet sets are respectively transmitted in multiple scanning time periods sequentially arranged by multiple network devices, where the multiple scanning time periods have respective sequence numbers;
- by the processor, respectively for each of the multiple packet sets, updating a packet processing rule table in a memory by utilizing the second packet processing rules being different from multiple first packet processing rules, and calculating an average rule quantity for the second packet processing rules being different from the multiple first packet processing rules, where the multiple first packet processing rules store in the packet processing rule table;
- by the processor, sequentially selecting multiple time intervals from the multiple scanning time periods based on the respective sequence numbers of the multiple scanning time periods, where a quantity for the scanning time periods comprised in each of the multiple time intervals is a window quantity; and
- by the processor, calculating a trend slope of a trend line in the each of the multiple time intervals based on the average rule quantity corresponding to each of the packet sets captured in the each of the multiple time intervals by utilizing a trend construction algorithm, and determining whether to stop updating the packet processing rule table based on the multiple trend slopes.

Compared with related technologies, a technical effect which the present disclosure can achieve is that an average rule quantity for multiple new packet processing rules can be directly used to calculate slopes of respective corresponding trend lines, and whether to stop updating a pre-stored packet processing rule table is determined based on these slopes, thereby solving a traditional problem of being unable to know about when to stop generating the packet processing rules.

DETAILED DESCRIPTION

In cooperation with the attached drawings, the technical contents and detailed description of the present disclosure are described hereinafter based on multiple embodiments, being not used to limit its executing scope. Any equivalent variation and modification made based on appended claims is all covered by the claims claimed by the present disclosure.

Figure 1:
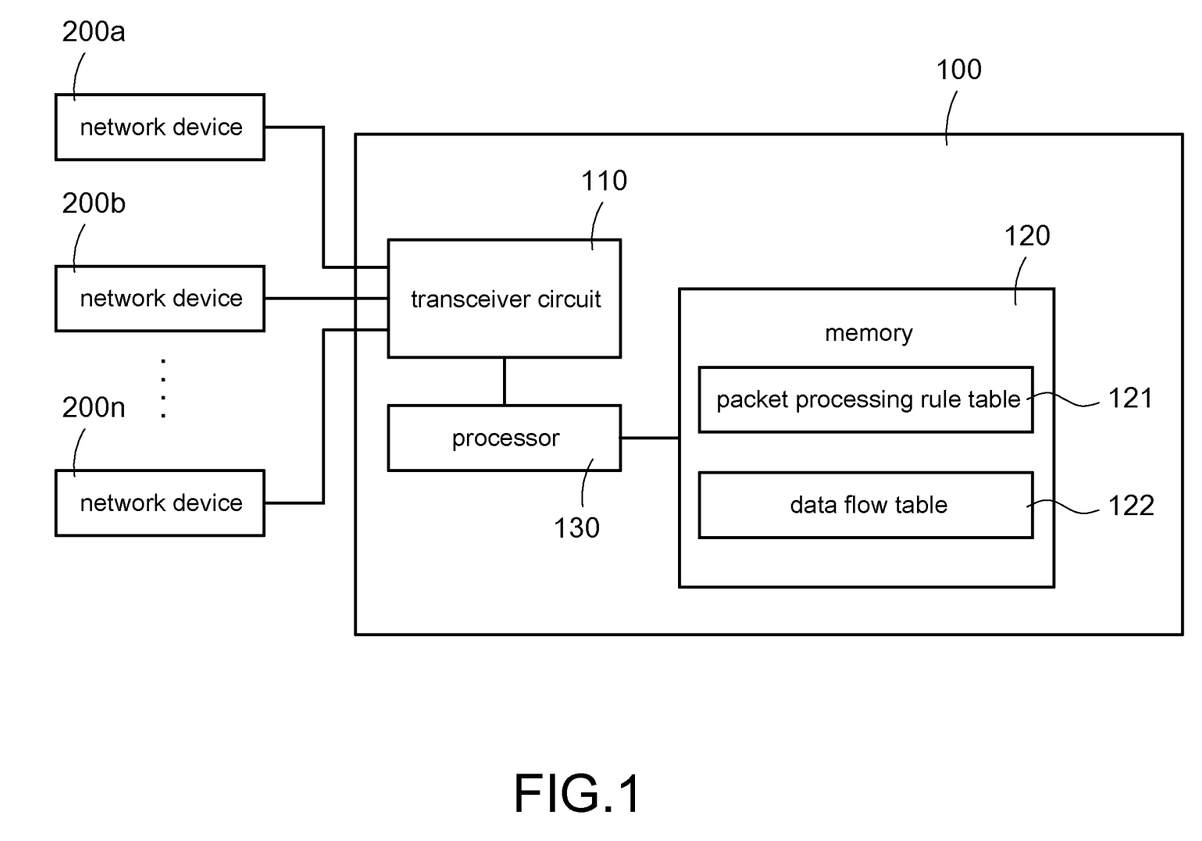
FIG. 1 is a schematic diagram illustrating a network management device in some embodiments of the present disclosure.

Reference is made to FIG. 1, which is a schematic diagram illustrating a network management device 100 in some embodiments of the present disclosure. The network management device 100 can be implemented by any network relay device (e.g., a router or a switch, etc.) and connected to multiple network devices 200a-200n. As shown in FIG. 1, the network management device 100 includes a transceiver circuit 110, a memory 120, and a processor 130. The processor 130 is coupled to the transceiver circuit 110 and the memory 120.

In this embodiment, the transceiver circuit 110 sequentially captures multiple packet sets respectively transmitted by the network devices 200a-200n in multiple scanning time periods which is sequentially arranged, where the multiple scanning time periods have respective sequence numbers, where the respective sequence numbers of the multiple scanning time periods indicate respective arrangement orders (i.e., the earlier scanning time period has a smaller sequence number), where n is any positive integer without special restriction. In other words, each packet set is transmitted to the transceiver circuit 110 by the network devices 200a-200n in each scanning time period. Multiple scanning time periods have a sort order. In detail, the transceiver circuit 110 collects all packets transmitted by the network devices 200a-200n in each scanning time period as a packet set.

In some embodiments, the transceiver circuit 110 can be one of a transmitter circuit, an analog-to-digital converter, a digital-to-analog converter, a low-noise amplifier, a mixer, a filter, an impedance matcher, a transmission line, a power amplifier, one or more antenna circuits, and local storage media elements, either along or in a combination thereof. In some embodiments, the network devices 200a-200n can be implemented by any network terminal (e.g., a personal desktop computer, a mobile phone, a tablet computer, or a server, etc.), and connected to the transceiver circuit 110 in a wired or wireless method.

In this embodiment, the memory 120 stores multiple instructions and a packet processing rule table 121. The packet processing rule table 121 stores multiple first packet processing rules. The processor 120 performs detailed steps described in subsequent paragraphs based on these instructions. In some embodiments, these instructions can be corresponding software or firmware instruction programs. In some embodiments, the first packet processing rule indicates a rule to be applied in a current network. In some embodiments, the first packet processing rule can be implemented by any type of network packet rule (e.g., a network access control list rule (ACL rule)). In some embodiments, the first packet processing rule includes a field for a source device, a field for a destination device, a field for a destination port, a field for a protocol, and a field for a corresponding data flow number.

In some embodiments, the memory 120 further stores a data flow table 122. The data flow table 122 stores data corresponding to each of multiple first data flows. In some embodiments, the first data flows are data flows detected in the current network. In some embodiments, the data corresponding to the multiple first data flows include a data flow number, a field for detection time, a field for a source device, a field for a destination device, a field for a source port, a field for a destination port, and a field for a protocol. It should be noted that since the source device can change the source port frequently, the first packet processing rule does not store the field for the source port. The following uses Table 1 and Table 2 to describe the packet processing rule table 121 and the data flow table 122.

TABLE 1

| Data flow number | Detection time | Source device | Destination device | Source port | Destination port | Protocol |
|---|---|---|---|---|---|---|
| 1 | 100 | network device 1 | network device 2 | 111 | 502 | tcp |
| 2 | 102 | network device 1 | network device 3 | 222 | 102 | tcp |
| 3 | 105 | network device 1 | network device n | 333 | 3389 | udp |

As shown in Table 1, Table 1 is an example of the data flow table 122. The data flow table 122 stores the data corresponding to the first data flows with data flow numbers 1-3. The processor 130 can read from the data flow table 122 that the detection time of the first data flow with the data flow number 1 is 100 seconds, the source device of the first data flow with the data flow number 1 is the network device 1, the destination device of the first data flow with the data flow number 1 is the network device 2, the source port of the first data flow with the data flow number 1 is 111, the destination port of the first data flow with the data flow number 1 is 502, and the protocol of the first data flow with the data flow number 1 is tcp. By analogy, the processor 130 can also read the data corresponding to the first data flows with the data flow numbers 2-3 from the data flow table 122.

TABLE 2

| Rule number | Source device | Destination device | Destination port | Protocol | corresponding data flow number |
|---|---|---|---|---|---|
| 1 | network device 1 | network device 2 | 502 | tcp | 1 |
| 2 | network device 1 | network device 3 | 102 | tcp | 2 |
| 3 | network device 1 | network device n | 3389 | udp | 3 |

As shown in Table 2, Table 2 is an example of the packet processing rule table 121. The packet processing rule table 121 stores the data corresponding to the first packet processing rules with the rule numbers 1-3. The processor 130 can read from the packet processing rule table 121 that the source device of the first packet processing rule with the rule number 1 is the network device 1, the destination device of the first packet processing rule with the rule number 1 is the network device 2, the destination port of the first packet processing rule with the rule number 1 is 502, the protocol of the first packet processing rule with the rule number 1 is tcp, and the data flow number of the first packet processing rule with the rule number 1 is 1. By analogy, the processor 130 can also read the data corresponding to the first packet processing rules with the rule numbers 2-3 from the packet processing rule table 121. Furthermore, the first packet processing rules with the rule numbers 1-3 are respectively constituted by the first data flows with the data flow numbers 1-3 excluding the field for the detection time and the field for the source port.

In some embodiments, the memory 120 can be implemented by a flash memory, a read-only memory, a hard disk, or any equivalent storage component. In some embodiments, the processor 130 can be implemented by a central processing unit (CPU), a micro control unit (MCU), a programmable logic controller (PLC), a system on chip (SoC), or a field programmable gate array (FPGA), but not limited to this.

Figure 2:
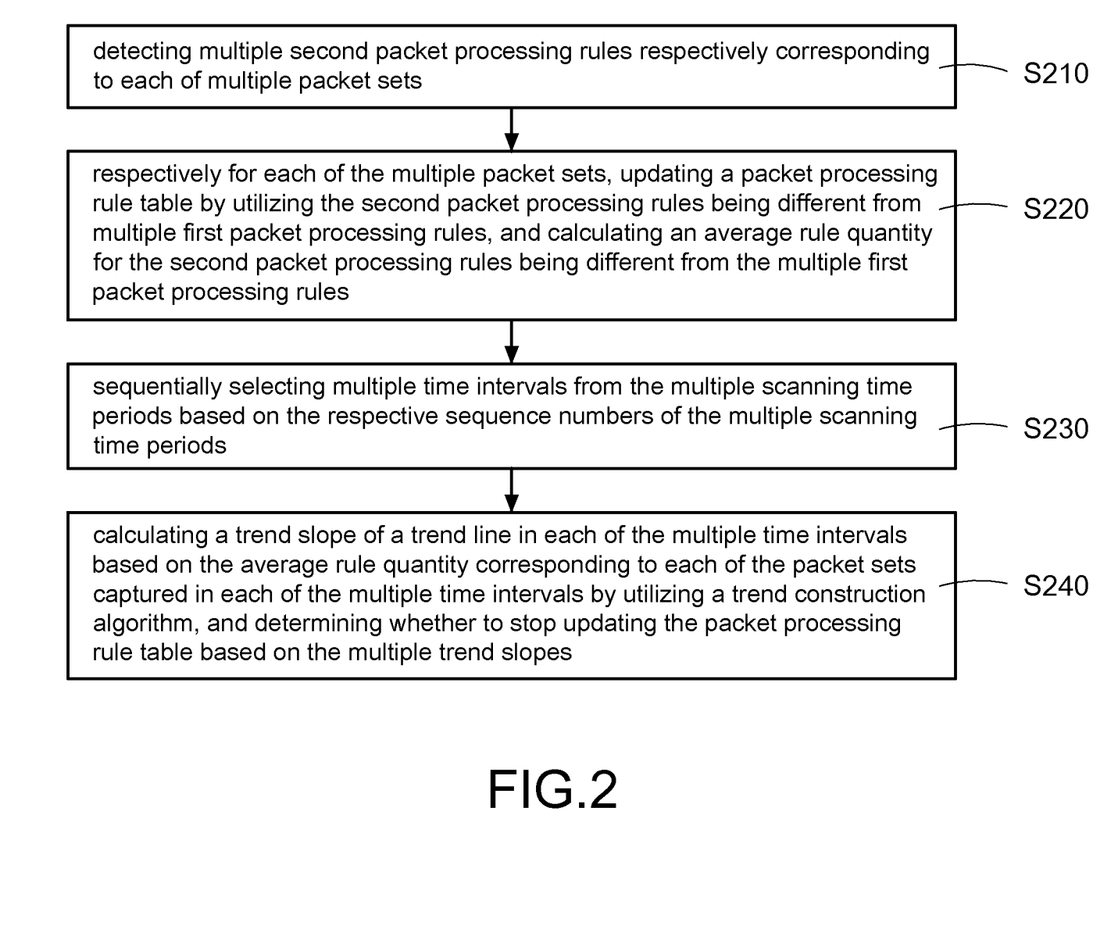
FIG. 2 is a flow chart illustrating a method for updating rules in some embodiments of the present disclosure.

Reference is made to FIG. 2, which is a flow chart illustrating a method for updating rules in some embodiments of the present disclosure. This rule update method is applicable to the network management device 100 shown in FIG. 1.

As shown in FIG. 2, first, in step S210, the processor 130 obtains the multiple packet sets respectively transmitted by network devices 200a-200n in the multiple scanning time periods sequentially arranged, and detects multiple second packet processing rules respectively corresponding to each of the multiple packet sets. In some embodiments, respectively for each of the multiple packet sets, the processor 130 detects whether multiple corresponding second data flows match the data flow table 122, and generates the multiple corresponding second packet processing rules based on a header data of one of packets respectively corresponding to each of multiple unmatched second data flows.

In some embodiments, the processor 130 detects the header data of each of multiple packets which are included in the multiple packet sets to identify the multiple corresponding second data flows respectively corresponding to the multiple packet sets. Next, the processor 130 compares whether the data in multiple specific fields in the header data corresponding to each of the multiple second data flows is different from data corresponding to the multiple first data flows in the data flow table 122. When the data in the multiple specific fields in the header data corresponding to one of the multiple second data flows is different from the data corresponding to the multiple first data flows in the data flow table 122, the processor 130 generates one of the multiple second packet processing rules based on the data in the multiple specific fields in the header data corresponding to the second data flow. In some embodiments, the multiple specific fields can be the same as or similar as the multiple fields in the data flow table 122, that is, can include the field for detection time, the field for the source device, the field for the destination device, the field for the source port, the field for the destination port, and the field for the protocol.

For example, the processor 130 reads the header data of one of the packets in one of the packet sets at 110 seconds, and reads "network device 2" from the field for the source device, reads "network device n" from the field for the destination device, reads "111" from the field for the source port, reads "502" from the field for the destination port, and reads "tcp" from the field for the communication protocol. Next, the processor 130 compares these read data with the data corresponding to each of the multiple first data flows in the data flow table 122 of Table 1.

At this time, the processor 130 determines that the data read from this packet are different from the data corresponding to the multiple first data flows. The processor 130 determines that the second data flow corresponding to this packet is a new data flow. Next, the processor 130 stores the data of the specific fields of the header data of this packet (i.e., the data corresponding to the second data flow) in the data flow table 122, and then sets the data flow number corresponding to this second data flow as 4. Finally, the processor 130 generates a corresponding second packet processing rule based on the data in the above-mentioned specific field for the header data of this packet, sets the field for the source device in this second packet processing rule as the network device 2, sets the field for the destination device as the network device n, sets the field for the destination port as 502, sets the field for the protocol as tcp, and sets the field for the data flow number as 4.

In step S220, the processor 130, respectively for each of the multiple packet sets, updates the packet processing rule table 121 by utilizing the second packet processing rules being different from the multiple first packet processing rules, and calculates an average rule quantity for the second packet processing rules being different from the multiple first packet processing rules (i.e., a quantity being detected in a unit scanning time). In some embodiments, the processor 130, respectively for each of the multiple packet sets, stores the second packet processing rules being different from the multiple first packet processing rules in the packet processing rule table 121, so as to update the packet processing rule table 121. In some embodiments, in each of the multiple scanning time periods, the processor 130 calculates a total quantity for the second packet processing rules detected to be different from the multiple first packet processing rules, and calculates the average quantity of the second packet processing rules being different from the multiple first packet processing rules based on the total quantity and the unit scanning time (e.g., assuming that a time length of the scanning time period is ten seconds and the unit scanning time is five seconds, when ten second packet processing rules being different from the multiple first packet processing rules are generated, the processor 130 can calculate the average rule quantity is 5).

In some embodiments, the processor 130 sets a time length of one of the scanning time periods based on the average rule quantity for detected in each of at least two of the scanning time periods arranged before the one of the scanning time periods. In some embodiments, the processor 130 calculates a ratio between the average rule quantity for detected in each of at least two scanning time periods arranged before the one of the scanning time periods, and calculates a ceiling value of a product value between the ratio and the time length of last one of the at least two of the scanning time periods as the time length of the one of the scanning time periods, where, when the average rule quantity for detected in at least the first one of the at least two of the scanning time periods is equal to zero or the average rule quantities for detected in the at least two of the scanning time periods are both equal to zero (i.e., a denominator of the above-mentioned ratio can be zero), the processor 130 sets the time length of the one of the scanning time periods as the time length of the last one of the at least two of the scanning time periods (i.e., maintains the same time length).

For example, assuming that the average rule quantity for detected in the first scanning time period is 150, the average rule quantity for detected in the second scanning time period is 135, and the time length of the second scanning time period is 5 seconds, the processor 130 calculates the ceiling value (i.e., 2) of the ratio between the average rule quantity (i.e., 150) for detected in the first scanning period and the average rule quantity (i.e., 135) for detected in the second scanning period. Next, the processor 130 calculates the product value between this ceiling value and the time length of the second scanning time period as the time length (i.e., 10 seconds) of the third scanning time period. By analogy, the processor 130 can calculate the time lengths of other scanning time periods after the third scanning time period in the same method. The length of the scanning time period can be further adjusted by detecting an upward trend or a downward trend in the average rule quantity.

The aforementioned method can prevent the time length of the scanning time period from being too short, causing early stopping of the detection of the second packet processing rules (i.e., new packet processing rules) being different from the multiple first packet processing rules, and prevent an excessively long scanning time period from causing the detection time of the second packet processing rules being different from the multiple first packet processing rules to be greatly lengthened.

Furthermore, in step S230, the processor 130 sequentially selects multiple time intervals from the multiple scanning time periods based on the respective sequence numbers of the multiple scanning time periods, where a quantity for the scanning time periods included in each of the multiple time intervals is a window quantity (i.e., one time interval can be regarded as one detection window), and the processor 130 detects one detection window at a time in subsequent trend slope detection (e.g., the processor 130 takes 6 scanning time periods at a time as one time interval to calculate one trend line in this time interval and calculates a trend slope of this trend line)). In other words, the processor 130 selects one of the scanning time periods with the sequence number in front from the multiple scanning time periods as a starting point and sets the starting point and a continuous part of the scanning time periods arranged after the starting point as one of the time intervals, where the quantity for the scanning time periods in the one of the time intervals is the window quantity. By analogy, the processor 130 can generate other time intervals in the same way. In some embodiments, a quantity for the time intervals is the quantity for scanning time periods minus the window quantity plus one (e.g., assuming there are 12 scanning time periods and the window quantity is 6, 7 scanning time periods arranged with smaller sequence numbers are respectively selected as the starting points for 7 time intervals, and the quantity for these time intervals is 7). Subsequent paragraphs will further explain this using practical examples and will not be repeated here.

Furthermore, in step S240, the processor 130 calculates a trend slope of a trend line in each of the multiple time intervals based on the average rule quantity corresponding to each of the packet sets captured in each of the multiple time intervals by utilizing a trend construction algorithm and determines whether to stop updating the packet processing rule table 121 based on the multiple trend slopes. In some embodiments, the processor 130 generates the trend line in each of the multiple time intervals by utilizing the trend construction algorithm based on the average rule quantity corresponding to each of the packet sets captured in each of the multiple time intervals and calculates a slope of the trend line in each of the multiple time intervals as the trend slope in each of the multiple time intervals.

Figure 3:
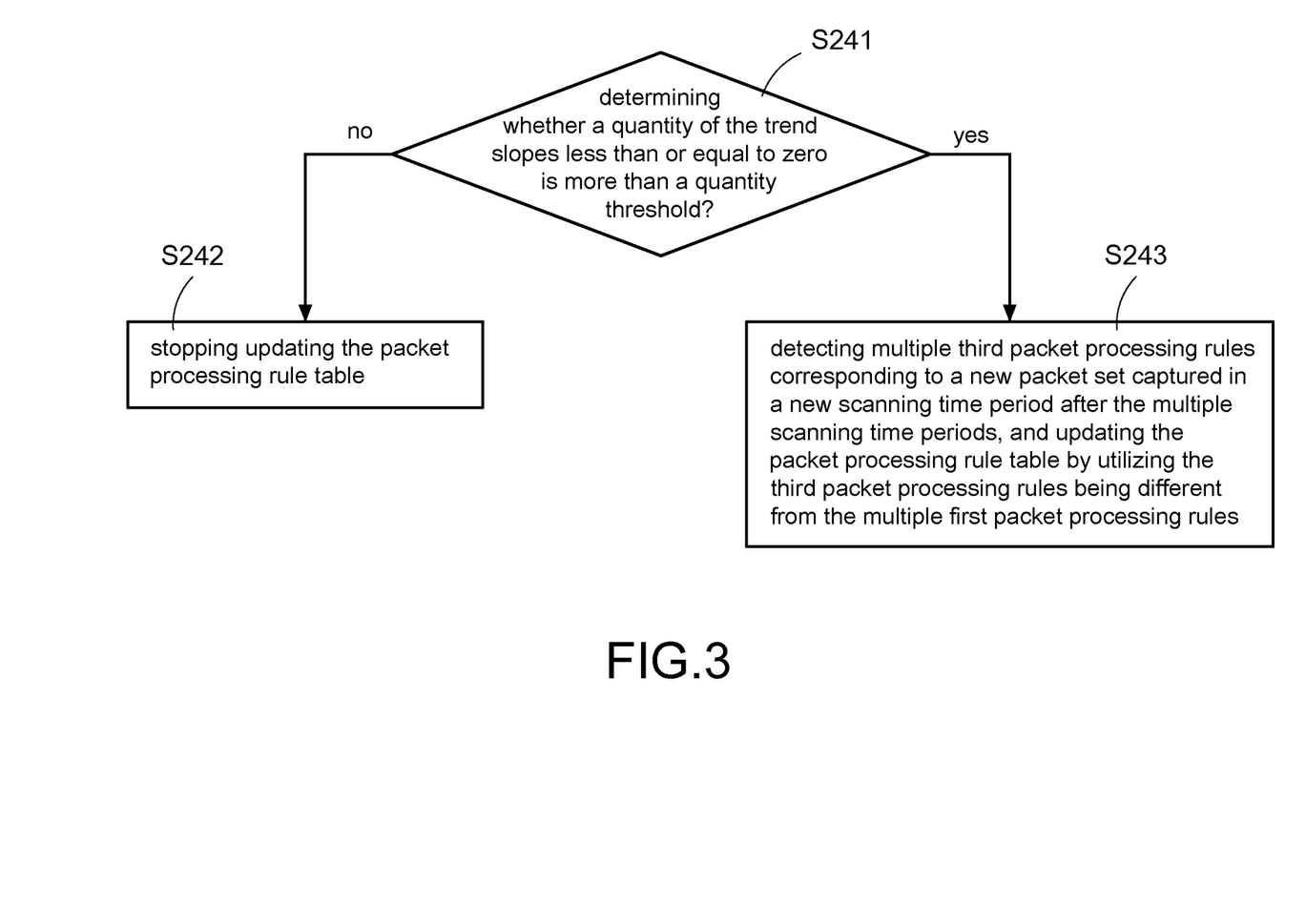
FIG. 3 is a flowchart illustrating steps included in one of the steps in the method for updating rules in some embodiments of the present disclosure.

Reference is made to FIG. 3, which is a flow chart illustrating steps S241-S243 included in step S240 of the method for updating rules in some embodiments of the present disclosure. As shown in FIG. 3, in step S241, the processor 130 determines whether a quantity of the trend slopes less than or equal to zero is more than a quantity threshold. When the quantity of the trend slopes less than or equal to zero is more than the quantity threshold, the processor 130 executes step S242. On the contrary, when the quantity of the trend slopes less than or equal to zero is not more than the quantity threshold (there can be situations where all trend slopes are less than or equal to zero), the processor 130 executes step S243. In step S242, the processor 130 stops updating the packet processing rule table 121. In step S243, the processor 130 detects multiple third packet processing rules corresponding to a new packet set captured in a new scanning time period after the multiple scanning time periods, and updates the packet processing rule table 121 by utilizing the third packet processing rules being different from the multiple first packet processing rules (i.e., one or more third packet processing rules being different from the multiple first packet processing rules are stored in the packet processing rule table 121). In some embodiments, the trend construction algorithm can be implemented by any trend analysis algorithm (e.g., a linear regression algorithm, a logistic regression algorithm, a polynomial regression algorithm, a moving average algorithm, an exponential average algorithm, or an autoregressive integrated moving average algorithm, etc.). Through determining the above-mentioned multiple trend slopes, occurrence of a true minimum value of the average rule quantity can be detected. In conclusion, a problem that occurrence of a local minimum value of the average rule quantity causes updating action of the packet processing rule table 121 to be stopped prematurely can be solved, and a problem that a large quantity for subsequent transmitted packet processing rules cannot be detected caused by the prematurely stopping can be solved as well.

The time length of the above-mentioned scanning time period and the method for updating rules are further explained below with practical examples.

Figure 4:
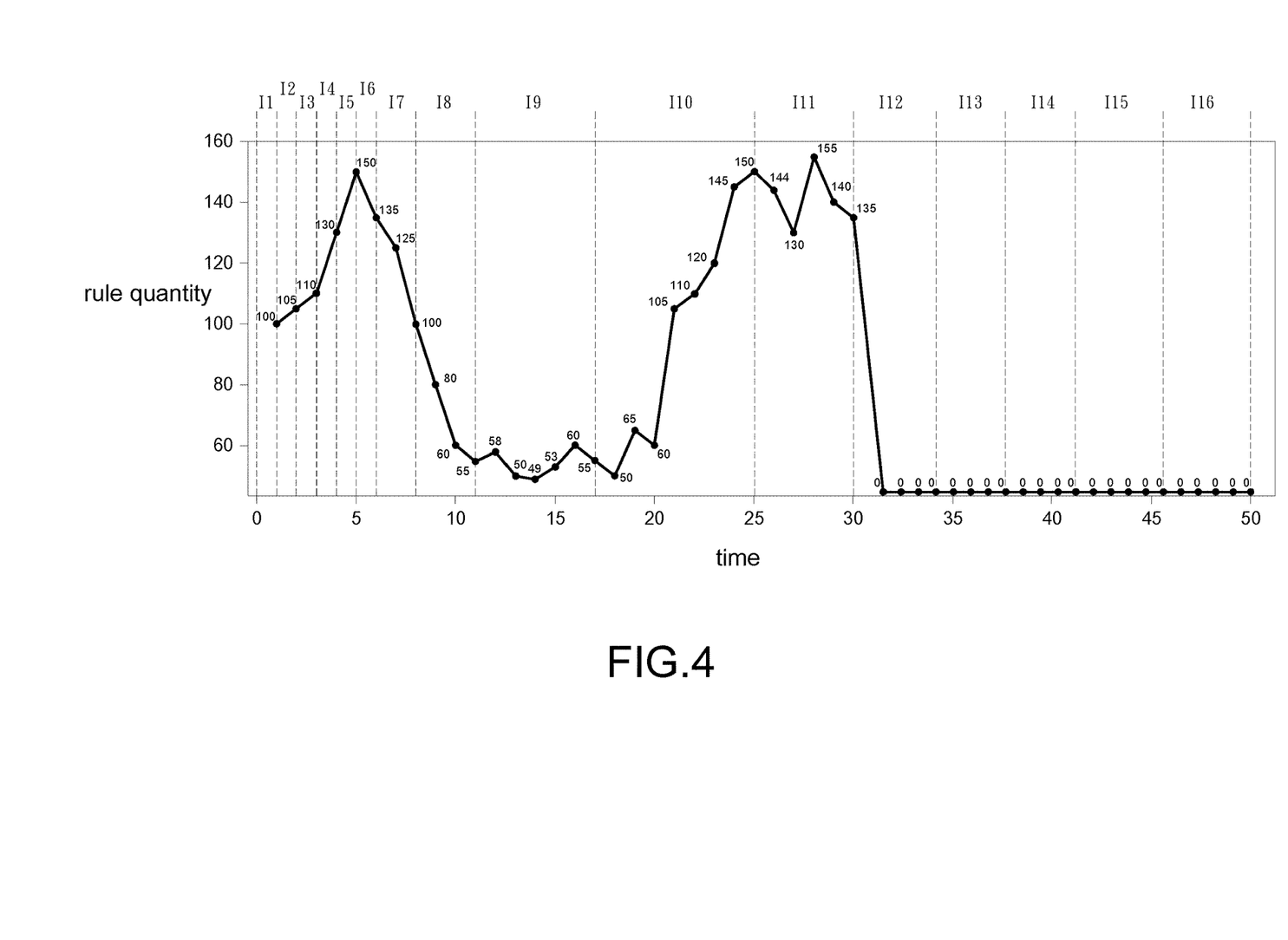
FIG. 4 is a schematic diagram illustrating a relationship between new rule quantities and time in some embodiments of the present disclosure.

Reference is made to FIG. 4, which is a schematic diagram illustrating a relationship between new rule quantities and time in some embodiments of the present disclosure. As shown in FIG. 4, the network devices 200a-200n generate a rule quantity of the second packet processing rules being different from the first packet processing rules (hereinafter referred to as new packet processing rules) at each time (i.e., every second). For example, the network devices 200a-200n generate 100 new packet processing rules in a first second, and then generate 105 new packet processing rules in a second second.

Furthermore, assuming that an initial time length of the scanning time period is 1 second and the unit scanning time is 1 second, the processor 130 sets a first scanning time period I1 as a time period more than 0 second and less than or equal to 1 second, and then sets a second scanning time period I2 as a time period more than 1 second and less than or equal to 2 seconds. At this time, the processor 130 respectively detects 100 and 105 new packet processing rules in the first scanning period I1 and the second scanning period I2. The processor 130 calculates the average rule quantity (i.e., 100 per second) for the new packet processing rules detected in the first scanning period I1 and the average rule quantity (i.e., 105 per second) for the new packet processing rules detected in the second scanning period I2. The processor 130 calculates the ratio (i.e., 0.95) between the above-mentioned two average rule quantities and calculates the ceiling value (i.e., 1) of the product value (i.e., 0.95) between this ratio and the time length (i.e., 1) of the second scanning period I2 as the time length of a third scanning time period I3. Therefore, the processor 130 sets the third scanning period I3 as a time period more than 2 seconds and less than or equal to 3 seconds. By analogy, the processor 130 can set multiple scanning time periods I4-I16 after the scanning time period I3 in the same way before stopping the detection for new packet processing rules.

It should be noted that when there is a downward trend in the average rule quantities for the new packet processing rules detected in two scanning time periods before one of the scanning time periods (i.e., the average rule quantity of the earlier scanning time period is more than that of the later scanning time period), the processor 130 can extend a time length of the one of the scanning time periods (if the downward trend in the average rule quantities is not large enough, the time length will not be adjusted). On the contrary, when there is an upward trend in the average rule quantities for the new packet processing rules detected in two scanning periods before one of the scanning periods (i.e., the average rule quantity of the earlier scanning time period is less than that of the later scanning time period), the processor 130 can shorten a time length of the one of the scanning time periods (if the upward trend of the average rule quantities is not large enough, the time length will not be adjusted).

For example, since an average rule quantity (i.e., 150 per second) for detected in a scanning time period I5 is more than the average rule quantity (i.e., 135 per second) for detected in a scanning time period I6, the processor 130 calculates that a ceiling value is 2. Next, the processor 130 extends (because the downward trend is large enough) a time length of a scanning time period I7 as 2 seconds (the time length of the previous scanning time period I6 is 1 second), and then sets the scanning time period I7 as a time period more than 6 seconds and less than or equal to 8 seconds. In another example, since an average rule quantity (i.e., 55 per second; 325÷6=54.1) for detected in a scanning time period I9 is less than an average rule quantity (i.e., 101 per second; 805÷8=100.6) for detected in a scanning time period I10, the processor 130 calculates that a ceiling value is 5. Next, the processor 130 shortens (because the upward trend is large enough) a time length of the scanning time period I11 as 5 seconds (a time length of a previous scanning time period I10 is 8 seconds; ceil (54.1÷100.6×5)=5, where ceil (,) is a ceiling value function), and then sets the scanning time period I11 as a time period more than 25 seconds and less than or equal to 30 seconds.

Figure 5:
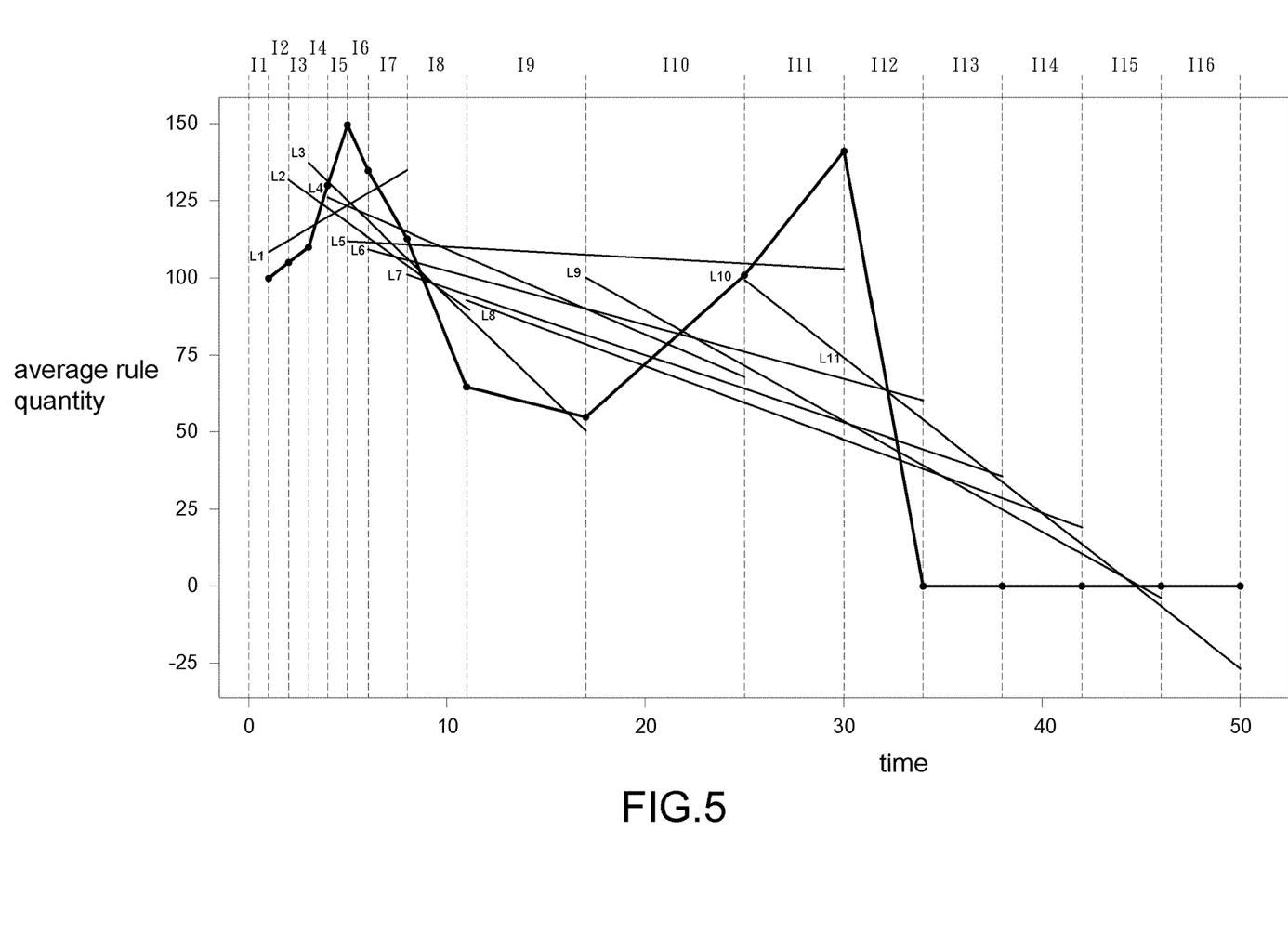
FIG. 5 is a schematic diagram illustrating a relationship between average rule quantities and time in some embodiments of the present disclosure.

Reference is made to FIG. 5, which is a schematic diagram illustrating a relationship between average rule quantities and time in some embodiments of the present disclosure. As shown in FIG. 5, continuing the example of FIG. 3, assuming that the window quantity is 6 (i.e., the processor 130 takes 6 scanning time periods at a time to calculate one trend line) and the quantity of the time intervals is 10 (i.e., the processor 130 detects a slope of 10 consecutive trend lines at a time), the processor 130 respectively selects 10 time periods from scanning time periods I1-I16 based on sequence numbers I1-I10 of the scanning time periods. In detail, the processor 130 selects the scanning time period with the sequence number I1 as a starting point, and selects the scanning time period with sequence numbers I1-I6 as a first time interval. Next, the processor 130 calculates a trend line L1 corresponding to the first time interval by utilizing the trend construction algorithm according to the average rule quantity (i.e., 100 per second, 105 per second, 110 per second, 130 per second, 150 per second, and 135 per second) in each of the scanning time periods with the sequence numbers I1-I6 in the first time interval. The processor 130 selects the scanning time period I2 and the scanning time periods I3-I7 after the scanning time period I2 as a second time interval, and generates a trend line L2 corresponding to the second time interval by utilizing the trend construction algorithm based on the average rule quantity in the scanning time periods with the sequence numbers I2-I7 in the second time interval. By analogy, the processor 130 generates trend lines L3-L10 respectively corresponding to third to tenth time intervals by utilizing the same method. In this way, the processor 130 determines whether trend slopes of the trend lines L1-L10 are all equal to or less than zero. As can be seen from FIG. 5, the processor 130 can determine that the trend slopes of the trend lines L2-L10 are all less than zero but the trend slope of the trend line L1 is more than zero. In this embodiment, the processor 130 does not stop updating the packet processing rule table 121. Therefore, the processor 130 detects multiple third packet processing rules corresponding to a new packet set captured in a scanning time period with new sequence number I16 after the scanning time period with the sequence numbers I1-I15, and updates the packet processing rule table 121 by utilizing the third packet processing rules being different from the multiple first packet processing rules. In this embodiment, the processor 130 detects that the average rule quantity of the third packet processing rules being different from the multiple first packet processing rules is 0.

Next, the processor 130 selects the scanning time period with the sequence numbers I2-I11 as the starting points. The processor 130 selects the scanning time period with the sequence numbers I2-I7 as the first time interval, and generates the trend line L2 corresponding to the first time interval by utilizing the trend construction algorithm based on the average rule quantities for the scanning time periods with the sequence numbers I2-I7 in the first time interval. The processor 130 selects the scanning time period with the sequence numbers I3-I8 as the second time interval, and generates the trend line L3 corresponding to the second time interval by utilizing the trend construction algorithm based on the average rule quantities in the scanning time periods with the sequence numbers I3-I8 in the second time interval. By analogy, the processor 130 generates the trend lines L4-L11 respectively corresponding to the third to tenth time intervals by utilizing the same method. Next, the processor 130 determines whether the trend slopes of the trend lines L2-L11 are all equal to or less than zero. As can be seen from FIG. 5, the processor 130 can determine that the trend slopes of the trend lines L2-L11 are all less than or equal to zero. Therefore, the processor 130 stops updating the packet processing rule table 121.

In summary, the network management device and the method for updating rules proposed in the present disclosure can detect the average rule quantity for new packet processing rules in each scanning time period, and calculate the respective trend slopes of multiple trend lines based on these average rule quantities. In this way, the network management device and the method for updating rules proposed in the present disclosure can determine whether the new packet processing rules have been undetected or are about to be undetected on the network based on these trend slopes, so as to stop updating the packet processing rule table. The present disclosure solves the traditional problem of not knowing when to stop generating packet processing rules. In addition, the network management device and the method for updating rules proposed in the present disclosure can dynamically adjust the time length of the scanning time period based on the average rule quantity for the new packet processing rules detected in each scanning time period, so as to prevent an excessively short scanning time period from causing early cessation of detection of the new packet processing rules, and to prevent the time length of the scanning time period from extending the detection time of the new packet processing rules.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A network management device (100), comprising:
a transceiver circuit (110), configured for capturing a plurality of packet sets respectively transmitted by a plurality of network devices (200a-200n) in a plurality of scanning time periods (I1-I16) sequentially arranged, wherein the plurality of scanning time periods (I1-I16) have respective sequence numbers;
a memory (120), configured for storing a plurality of instructions and a packet processing rule table (121), and the packet processing rule table (121) storing a plurality of first packet processing rules; and
a processor (130), coupled to the transceiver circuit (110) and the memory (120), and configured for executing the plurality of instructions to perform following steps:
detecting a plurality of second packet processing rules respectively corresponding to each of the plurality of packet sets;
respectively for each of the plurality of packet sets, updating the packet processing rule table (121) by utilizing the second packet processing rules being different from the plurality of first packet processing rules, and calculating an average rule quantity for the second packet processing rules being different from the plurality of first packet processing rules;
sequentially selecting a plurality of time intervals from the plurality of scanning time periods (I1-I16) based on the respective sequence numbers of the plurality of scanning time periods (I1-I16), wherein a quantity for the scanning time periods (I1-I16) comprised in each of the plurality of time intervals is a window quantity; and
calculating a trend slope of a trend line in each of the plurality of time intervals based on the average rule quantity corresponding to each of the packet sets captured in each of the plurality of time intervals by utilizing a trend construction algorithm, and determining whether to stop updating the packet processing rule table (121) based on the plurality of trend slopes.

2. The network management device (100) in claim 1, wherein the memory (120) stores a data flow table (122), and the data flow table (122) stores data corresponding to a plurality of first data flows, wherein in the step of detecting the plurality of second packet processing rules respectively corresponding to each of the plurality of packet sets, the processor (130) is configured for executing following steps:
respectively for each of the plurality of packet sets, detecting whether a plurality of corresponding second data flows match the data flow table (122), and correspondingly generating the plurality of second packet processing rules based on a header data of one of packets respectively corresponding to each of the plurality of second data flows that is unmatched with the data flow table (122).

3. The network management device (100) in claim 2, wherein in the step of, respectively for each of the plurality of packet sets, detecting whether the plurality of corresponding second data flows match the data flow table (122), the processor (130) is configured for executing following steps:
respectively for each of the plurality of packet sets, detecting header data of each of a plurality of packets comprised in each of the plurality of packet sets to identify the plurality of corresponding second data flows.

4. The network management device (100) in claim 3, wherein in the step of, respectively for each of the plurality of packet sets, detecting whether the plurality of corresponding second data flows match the data flow table (122), the processor (130) is further configured for executing following steps:
respectively for each of the plurality of packet sets, comparing whether data in a plurality of specific fields in the header data respectively corresponding to each of the plurality of second data flows is different from data corresponding to the plurality of first data flows in the data flow table (122); and
when the data in the plurality of specific fields in the header data corresponding to one of the pluralities of second data flows is different from the data corresponding to the plurality of first data flows in the data flow table (122), generating one of the pluralities of second packet processing rules based on the data of the plurality of specific fields in the header data corresponding to the second data flow.

5. The network management device (100) in claim 1, wherein the processor (130) is further configured for executing following steps:
setting a time length of a certain scanning time period of the plurality of scanning time periods (I1-I16) based on the respective average rule quantities for detected in at least two of the plurality of scanning time periods (I1-I16) arranged before the certain scanning time period.

6. The network management device (100) in claim 5, in the step of setting the time length of the certain scanning time periods (I1-I16) of the plurality of scanning time periods (I1-I16) based on the respective average rule quantities for detected in the at least two of the plurality of scanning time periods (I1-I16) arranged before the certain scanning time period, the processor (130) is further configured for executing following steps:
calculating a ratio between the average rule quantity for detected in each of the at least two of the plurality of scanning time periods (I1-I16) arranged before the certain scanning time period, and calculating a ceiling value of a product value between the ratio and the time length of a last one of the at least two of the plurality of scanning time periods (I1-I16) as the time length of the certain scanning time period,
wherein, when the average rule quantity for detected in first one of the at least two of the plurality of scanning time periods (I1-I16) is equal to zero or the average rule quantities for detected in the at least two of the plurality of scanning time periods (I1-I16) are both equal to zero, the processor (130) is configured for executing following steps:
setting the time length of the certain scanning time period as the time length of the last one of the at least two of the plurality of scanning time periods (I1-I16).

7. The network management device (100) in claim 1, wherein in the step of determining whether to stop updating the packet processing rule table (121) based on the plurality of trend slopes, the processor (130) is configured for executing following steps:
determining whether the trend slope in each of the plurality of time intervals is less than or equal to zero;
when the trend slope in each of the plurality of time intervals is less than or equal to zero, stopping updating the packet processing rule table (121); and
when the trend slope in any of the plurality of time intervals is not less than or equal to zero, detecting a plurality of third packet processing rules corresponding to a new packet set captured in a new scanning time period after the plurality of scanning time periods (I1-I16), and updating the packet processing rule table (121) by utilizing the third packet processing rules being different from the plurality of first packet processing rules.

8. The network management device (100) in claim 1, wherein in the step of sequentially selecting the plurality of time intervals from the plurality of scanning time periods (I1-I16) based on the respective sequence numbers of the plurality of scanning time periods (I1-I16), the processor (130) is configured for executing following steps:
  selecting one of the pluralities of scanning time periods (I1-I16) with the sequence number in front as a starting point, and setting by utilizing the starting point and a continuous part of the plurality of scanning time periods (I1-I16) arranged after the starting point as one of the pluralities of time intervals.

9. A method for updating rules, comprising:
  by a processor (130), detecting a plurality of second packet processing rules respectively corresponding to each of a plurality of packet sets, wherein the plurality of packet sets is respectively transmitted in a plurality of scanning time periods (I1-I16) sequentially arranged by a plurality of network devices (200a-200n), wherein the plurality of scanning time periods (I1-I16) have respective sequence numbers (S210);
  by the processor (130), respectively for each of the plurality of packet sets, updating a packet processing rule table (121) in a memory (120) by utilizing the second packet processing rules being different from a plurality of first packet processing rules, and calculating an average rule quantity for the second packet processing rules being different from the plurality of first packet processing rules, wherein the plurality of first packet processing rules are stored in the packet processing rule table (121) (S220);
  by the processor (130), sequentially selecting a plurality of time intervals from the plurality of scanning time periods (I1-I16) based on the respective sequence numbers of the plurality of scanning time periods (I1-I16), wherein a quantity for the scanning time periods (I1-I16) comprised in each of the plurality of time intervals is a window quantity (S230); and
  by the processor (130), calculating a trend slope of a trend line in each of the plurality of time intervals based on the average rule quantity corresponding to each of the packet sets captured in each of the plurality of time intervals by utilizing a trend construction algorithm, and determining whether to stop updating the packet processing rule table (121) based on the plurality of trend slopes (S240).

10. The method for updating rules in claim 9, wherein the memory (120) stores a data flow table (122), and the data flow table (122) stores data corresponding to a plurality of first data flows, wherein the step of, by the processor (130), detecting the plurality of second packet processing rules respectively corresponding to each of the plurality of packet sets comprises:
  by the processor (130), respectively for each of the plurality of packet sets, detecting whether a plurality of corresponding second data flows match the data flow table (122), and correspondingly generating the plurality of second packet processing rules based on a header data of one of packets respectively corresponding to each of the plurality of second data flows that is unmatched with the data flow table (122).

11. The method for updating rules in claim 10, wherein in the step of, by the processor (130), respectively for each of the plurality of packet sets, detecting whether the plurality of corresponding second data flows match the data flow table (122) comprises:
  by the processor (130), respectively for each of the plurality of packet sets, detecting header data of each of a plurality of packets comprised in each of the plurality of packet sets to identify the plurality of corresponding second data flows.

12. The method for updating rules in claim 11, wherein in the step of, by the processor (130), respectively for each of the plurality of packet sets, detecting whether the plurality of corresponding second data flows match the data flow table (122) comprises:
  by the processor (130), respectively for each of the plurality of packet sets, comparing whether data in a plurality of specific fields in the header data respectively corresponding to each of the plurality of second data flows is different from data corresponding to the plurality of first data flows in the data flow table (122); and
  when the data in the plurality of specific fields in the header data corresponding to one of the pluralities of second data flows is different from the data corresponding to the plurality of first data flows in the data flow table (122), by the processor (130), generating one of the pluralities of second packet processing rules based on the data of the plurality of specific fields in the header data corresponding to the second data flows.

13. The method for updating rules in claim 9, further comprising:
  by the processor (130), calculating a ratio between the average rule quantity for detected in each of at least two of the plurality of scanning time periods (I1-I16) arranged before a certain scanning time period of the plurality of scanning time periods (I1-I16), and calculating an ceiling value of a product value between the ratio and the time length of a last one of the at least two of the plurality of scanning time periods (I1-I16) as a time length of the certain scanning time period,
  wherein, when the average rule quantity for detected in first one of the at least two of the plurality of scanning time periods (I1-I16) is equal to zero or the average rule quantities for detected in the at least two of the plurality of scanning time periods (I1-I16) are both equal to zero, by the processor (130), setting the time length of the certain scanning time period as the time length of the last one of the at least two of the plurality of scanning time periods (I1-I16).

14. The method for updating rules in claim 9, wherein the step of, by the processor (130), determining whether to stop updating the packet processing rule table (121) based on the plurality of trend slopes comprises:
  by the processor (130), determining whether the trend slope in each of the plurality of time intervals is less than or equal to zero;
  when the trend slope in each of the plurality of time intervals is less than or equal to zero, by the processor (130), stopping updating the packet processing rule table (121); and
  when the trend slope in any of the plurality of time intervals is not less than or equal to zero, by the processor (130), detecting a plurality of third packet processing rules corresponding to a new packet set captured in a new scanning time period after the plurality of scanning time periods (I1-I16), and updating the packet processing rule table (121) by utilizing the third packet processing rules being different from the plurality of first packet processing rules.

15. The method for updating rules in claim 9, wherein the step of, by the processor (130), sequentially selecting the plurality of time intervals from the plurality of scanning time periods (I1-I16) based on the respective sequence numbers of the plurality of scanning time periods (I1-I16) comprises:

by the processor (130), selecting one of the pluralities of scanning time periods (I1-I16) with the sequence number in front as a starting point, and setting by utilizing the starting point and a continuous part of the plurality of scanning time periods (I1-I16) arranged after the starting point as one of the pluralities of time intervals.

* * * * *